(12) United States Patent
Srinivasan et al.

(10) Patent No.: US 8,195,818 B2
(45) Date of Patent: Jun. 5, 2012

(54) ENFORCING COMMUNICATION SECURITY FOR SELECTED RESOURCES

(75) Inventors: Suresh Srinivasan, Bangalore (IN); Amitabh Shukla, Deoghar (IN)

(73) Assignee: Oracle International Corporation, Redwood Shores, CA (US)

( * ) Notice: Subject to any disclaimer, the term of this patent is extended or adjusted under 35 U.S.C. 154(b) by 370 days.

(21) Appl. No.: 12/489,007

(22) Filed: Jun. 22, 2009

(65) Prior Publication Data

US 2010/0325294 A1 Dec. 23, 2010

(51) Int. Cl.
*G06F 15/16* (2006.01)
*G06F 7/04* (2006.01)
*G06F 17/30* (2006.01)
*H04N 7/16* (2011.01)

(52) U.S. Cl. ........... 709/229; 709/203; 709/219; 726/30
(58) Field of Classification Search .................. 709/203, 709/219, 229; 726/30
See application file for complete search history.

(56) References Cited

U.S. PATENT DOCUMENTS

| | | | |
|---|---|---|---|
| 5,907,621 A | 5/1999 | Bachman et al. | |
| 6,502,135 B1 * | 12/2002 | Munger et al. | 709/225 |
| 6,640,302 B1 * | 10/2003 | Subramaniam et al. | 713/169 |
| 6,718,390 B1 * | 4/2004 | Still et al. | 709/229 |
| 6,836,795 B2 | 12/2004 | Soderberg et al. | |
| 7,076,207 B2 | 7/2006 | Kurosawa et al. | |
| 7,100,049 B2 * | 8/2006 | Gasparini et al. | 713/170 |
| 7,216,236 B2 * | 5/2007 | Kou et al. | 713/183 |
| 7,249,377 B1 | 7/2007 | Lita et al. | |
| 2002/0099936 A1 * | 7/2002 | Kou et al. | 713/151 |
| 2006/0085504 A1 | 4/2006 | Yang et al. | |
| 2006/0112174 A1 * | 5/2006 | L'Heureux et al. | 709/223 |
| 2007/0229350 A1 * | 10/2007 | Scalisi et al. | 342/350 |
| 2008/0028206 A1 * | 1/2008 | Sicard et al. | 713/156 |
| 2008/0168017 A1 * | 7/2008 | Sreedhar et al. | 706/47 |
| 2010/0228963 A1 * | 9/2010 | Kassab et al. | 713/150 |

FOREIGN PATENT DOCUMENTS

WO 2006010058 A2 1/2006

OTHER PUBLICATIONS

Oreilly; "Apache Cookbook"; http://www.onlamp.com/pub/a/apache/2004/01/29/apache_ckbk.html; Jan. 29, 2004.

(Continued)

*Primary Examiner* — George C Neurauter
(74) *Attorney, Agent, or Firm* — Squire Sanders (US) LLP

(57) ABSTRACT

A secure resource enforcer is configured to identify and provide selected secure resources. The secure resource enforcer includes a determining module configured to determine whether a resource of a web page that is requested in a first request by a client computer requires a secure connection based on a type of the resource that is requested. The secure resource enforcer also includes a redirecting module configured to redirect the client computer to a secure socket for the resource when the resource requires the secure connection. The secure resource enforcer further includes a receiving module configured to receive a second request from the client for the resource over the secure socket and a secure resource providing module configured to provide the requested resource to the client over the secure socket.

14 Claims, 4 Drawing Sheets

OTHER PUBLICATIONS

"SSL and CRL Checking with GlassFish V2"; http://weblogs.java.net/blog/kumarjayanti/archive/2007/11/ssl_and_crl_che.html; Nov. 19, 2007.

"How can I hide parts of a page?"; http://help.mamboserver.com/index.php?option=com_content&task=view&id=131&Itemid=75; Apr. 23, 2009.

Twelve Dynamic HTML Lessons; http://www.devx.com/projectcool/Article/18103; Apr. 23, 2009.

Gilmore et al.; "Secure remote access to an Internet Web server"; IEPP Network; Nov./Dec. 1999; pp. 31-37.

Freudenthal et al.; "Switchboard: Secure, Monitored Connections for Client-Server Communication"; Proceedings of the 22nd International Conference on Distributed Computing Systems Workshops (ICDCSW'02); IEEE Computer Society; 2002.

Bisel; "The Role of SSL in Cybersecurity"; Published by the IEEE Computer Society; IT Pro Mar./Apr. 2007; pp. 22-25.

"How do I enable Secure Sockets Layer (SSL) connections to my Microsoft Virtual Server 2005 system?"; http://windowsitpro.com/article/articleid/48990/how-do-i-enable-secure-sockets-layer-ssl-connections-to-my-miscrosoft-virtual-server-2005-system.html; Jan. 29, 2006.

"Configuring SSL only for the login process"; http://publib.boulder.ibm.com/infocenter/lqkrhelp/v8r0/index.jsp?topic=/com.ibm.lotus.quickr.admin.wpv81.docwpf/ssl.html; Dec. 8, 2008.

"Enabling SSL on selected resources in IIS"; http://blogs.techconception.com/manny/2008/03/13/EnblingSSLOnSelectedResourcesInIIS.aspx; Mar. 13, 2008.

* cited by examiner

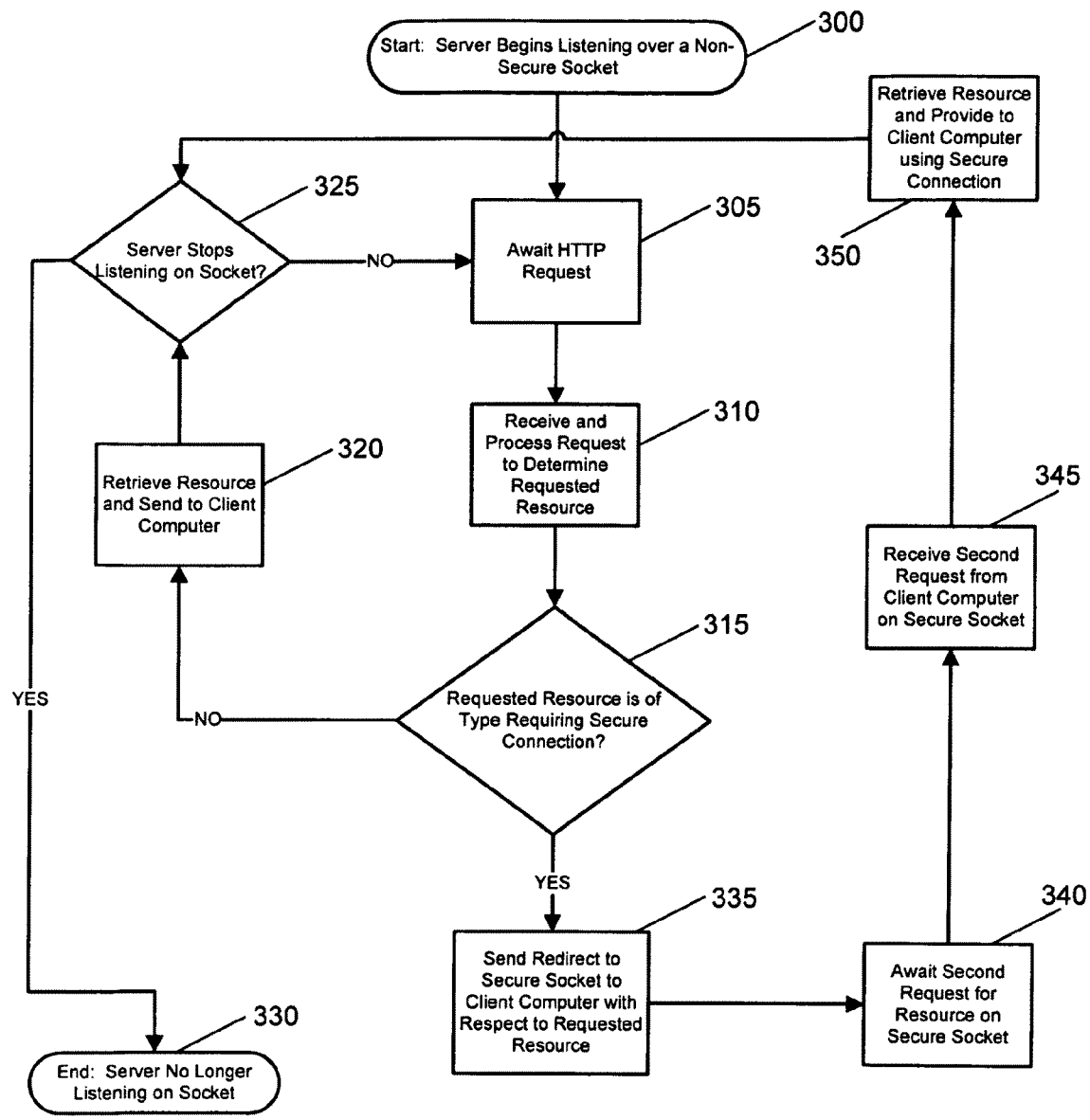

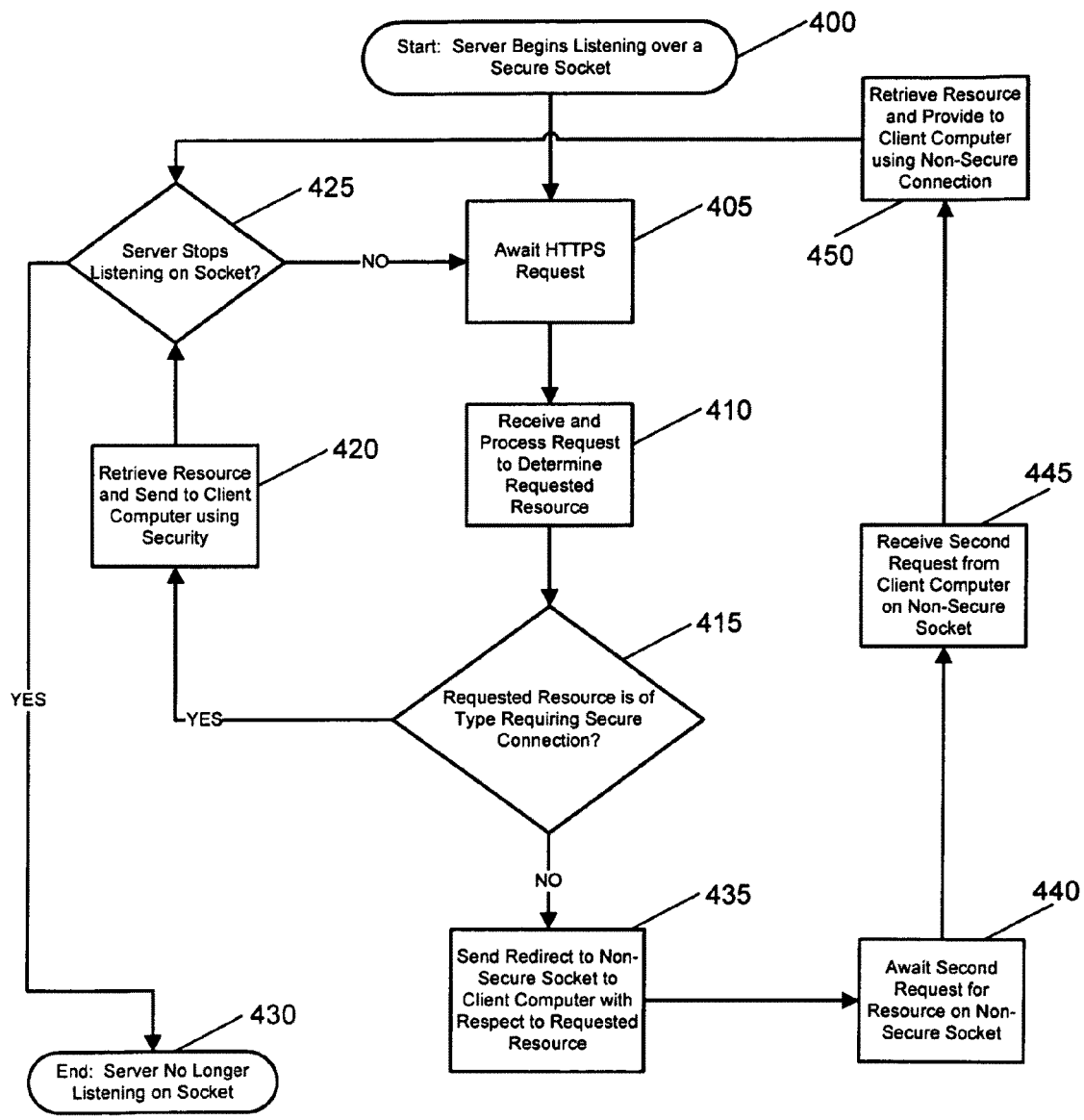

ENFORCING COMMUNICATION SECURITY FOR SELECTED RESOURCES

FIELD

One embodiment is directed generally to a client/server system, and in particular to security in a client/server system.

BACKGROUND

Generally, an entire web page (such as home.html) must either be secure or non-secure using, for instance, HyperText Transfer Protocol ("HTTP") or HyperText Transfer Protocol Secure ("HTTPS"). Otherwise, if HTTP is used and certain elements are to be secure, the elements that are to be secure must have a full HTTPS Universal Resource Locator ("URL") provided in the web page for each such element. This requires knowledge of the secure host/port configuration in advance by the developer of the web page, which restricts flexibility. If such a configuration were to change, the host/port for the element that is to be secure would have to either be manually changed in the web page or the secure element could no longer be retrieved.

SUMMARY

In an embodiment, a secure resource enforcer is configured to identify and provide selected secure resources. The secure resource enforcer includes a determining module configured to determine whether a resource of a web page that is requested in a first request by a client computer requires a secure connection based on a type of the resource that is requested. The secure resource enforcer also includes a redirecting module configured to redirect the client computer to a secure socket for the resource when the resource requires the secure connection. The secure resource enforcer further includes a receiving module configured to receive a second request from the client for the resource over the secure socket and a secure resource providing module configured to provide the requested resource to the client over the secure socket.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which:

FIG. 3 is a flow diagram illustrating a process flow for enforcing communication security for selected resources according to an embodiment of the present invention.

FIG. 4 is a flow diagram illustrating a process flow for determining whether to not provide security for selected resources according to another embodiment of the present invention.

DETAILED DESCRIPTION

Figure 1:
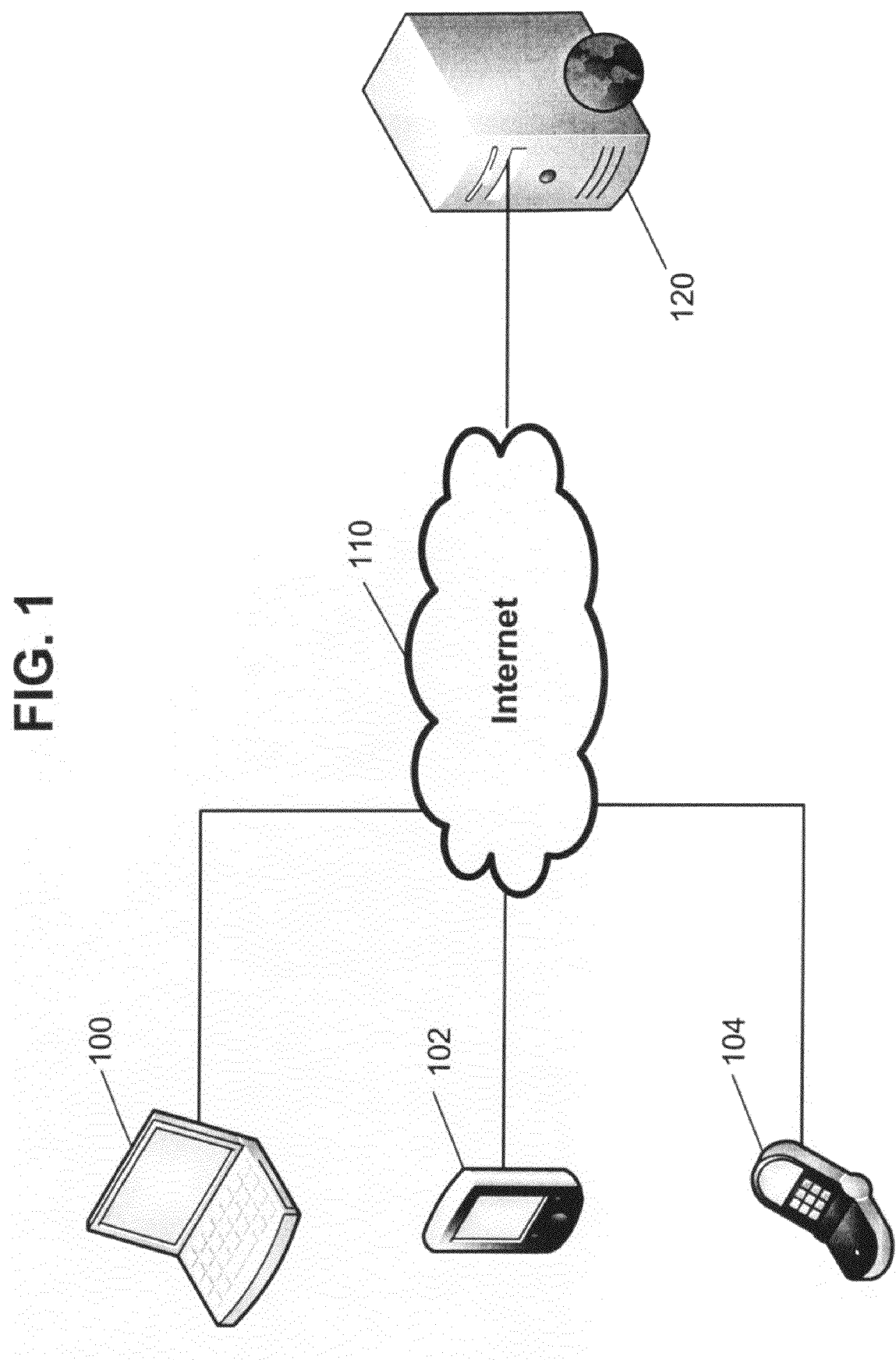
FIG. 1 is an architectural diagram of a client/server configuration that can implement some embodiments of the present invention.

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments", "some embodiments", or similar language means that a particular feature, structure, or characteristic described in connection with the embodiment is included in at least one embodiment of the present invention. Thus, appearances of the phrases "in certain embodiments", "in some embodiments", "in other embodiments", or similar language throughout this specification do not necessarily all refer to the same group of embodiments and the described features, structures, or characteristics may be combined in any suitable manner in one or more embodiments.

In addition, while the term "server" has been used in the description of some embodiments of the present invention, the invention may be applied to many types of network computing devices. For purposes of this invention, the term "server" includes rack computing systems, cloud computing systems, distributed computing systems, personal computers, laptops, cell phones, personal digital assistants, tablet computing devices, mainframes, any networked devices that perform computing operations, and any equivalents thereof. The server may also be a virtual server running via a web server application such as Oracle HTTP Server®, Apache HTTP Server® or Microsoft IIS® running on any of the aforementioned network computing devices. Further, the term "client computer" may include personal computers, laptops, cell phones, personal digital assistants ("PDAs"), tablet computing devices, any networked devices that perform computing operations, and any equivalents thereof.

One embodiment is a secure resource enforcer configured to determine whether a resource listed in a web page requested by a client computer is of a type that requires a secure connection. This may be performed by a secure directive added to a web server that responds to requests for resources of predetermined types with a redirect to a secure host/port. Unlike traditional client/server applications, where a developer of a web page must designate a specific host/port, known in advance, for a resource that is to be obtained via a secure connection, some embodiments of the secure resource enforcer give an administrator of a web server control to designate which resources require security. Such an embodiment increases flexibility and implementation independence over implementations where a developer of a web page designates a specific host/port for a resource that is to be secure. Further, such an embodiment reduces processing overhead with respect to implementations that provide the entire web page using security because secure protocols generally require more processing than non-secure protocols.

FIG. 1 is an architectural diagram of a client/server configuration that can implement some embodiments of the present invention. A personal computer 100, a PDA 102, a cell phone 104 and a web server 120 are all connected to the Internet 110. One of ordinary skill in the art will readily understand that further equipment, such as routers, switches, base stations and other servers, may be included within the Internet 110 to facilitate the connections. The communication between client devices 100, 102 and 104 and web server 120 may be entirely packet-based, facilitated by a protocol such as Transmission Control Protocol/Internet Protocol ("TCP/IP"), or partially circuit switched and partially packet-based using IP tunneling or a similar technology to send packets across circuit switched parts that may be present in a telecommunications network.

Client computing devices 100, 102 and 104 may retrieve web content from web server 120 via HTTP or some other web-based protocol. Web server 120 may be running a web server application that is listening on certain sockets. When any of client devices 100, 102 or 104 requests a resource over a non-secure socket, server 120 may check a configuration file or some other stored configuration information to see whether the resource should be secure. This information may be set by an administrator of web server 120. For example, information such as bank account balances, credit card numbers, or other sensitive information may be designated as secure by ensuring that the web resource in which such information is contained is listed in the configuration information. If the resource should be secure, web server 120 may send a redirect to the requesting device that causes the requesting device to send a second request to a secure socket. Server 120 would be listening on the secure socket and when the requesting device sends a second request for the resource to the secure host/port of the secure socket, server 120 would process the request for the resource and provide the resource to the requesting device over a secure connection. While the Internet 110 is illustrated in FIG. 1, a person of ordinary skill in the art will appreciate that embodiments of the present invention may be implemented in both open or closed networks, including intranets and extranets, and any other client/server environment.

Figure 2:
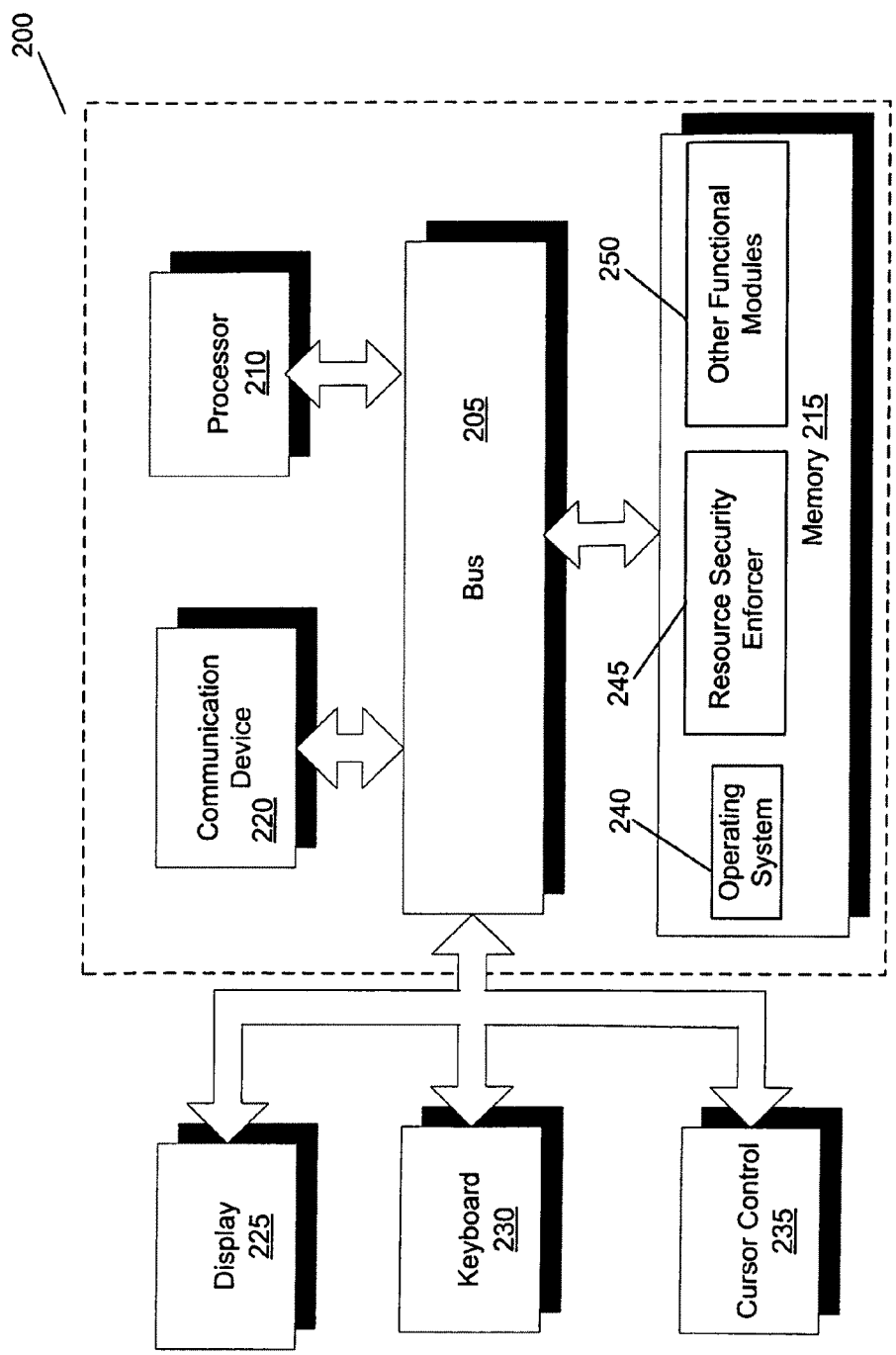
FIG. 2 is a block diagram illustrating a server having a secure resource enforcer that can implement an embodiment of the present invention.

FIG. 2 is a block diagram of a server 200 that can implement an embodiment of the present invention. Server 200 includes a bus 205 or other communication mechanism for communicating information, and a processor 210 coupled to bus 205 for processing information. Processor 210 may be any type of general or specific purpose processor, including a central processing unit ("CPU") or application specific integrated circuit ("ASIC"). Server 200 further includes a memory 215 for storing information and instructions to be executed by processor 210. Memory 215 can be comprised of any combination of random access memory ("RAM"), read only memory ("ROM"), flash memory, cache, static storage such as a magnetic or optical disk, or any other types of computer readable media or combination thereof. Additionally, server 200 includes a communication device 220, such as a network interface card, to provide access to a network. Therefore, a user may interface with server 200 directly, or remotely through a network or any other method.

Computer readable media may be any available media that can be accessed by processor 210 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 210 is further coupled via bus 205 to a display 225, such as a Liquid Crystal Display ("LCD"), for displaying information to a user, such as server status information. A keyboard 230 and a cursor control device 235, such as a computer mouse, is further coupled to bus 205 to enable a user to interface with system 200.

In one embodiment, memory 215 stores software modules that provide functionality when executed by processor 210. The modules include an operating system 240 that provides operating system functionality for server 200. The modules further include a secure resource enforcer 245 that is configured to identify and provide selected secure resources. Server 200 can be part of a larger system such as a cluster computing system, a distributed computing system, a cloud computing system, a "server farm" or any other system having multiple servers and/or computing devices. Server 200 will typically include one or more additional functional modules 250 to include additional functionality. In some embodiments, secure resource enforcer 245 may be part of operating system 240 or part of one or more other functional modules included in other functional modules 250.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 3 is a flow diagram illustrating a process flow for enforcing communication security for selected resources according to an embodiment of the present invention. In some embodiments, the functionality of FIG. 3, and FIG. 4 below, is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 3 may be performed, for example, by server 200 of FIG. 2 via secure resource enforcer 245. In FIG. 3, the process flow begins with a server beginning to listen on a non-secure socket at 300. The server awaits an HTTP request from a client at 305 over the non-secure socket, such as port 80, which is the known default port for HTTP. While HTTP is used in this example, one of ordinary skill in the art will readily appreciate that other client/server protocols may be used. In the case of HTTP, the request may be made using an HTTP GET command in the request line of the HTTP request. For instance, if the client computer wishes to retrieve an image resource banner.gif, the following may be included in the request line: "GET/images/banner.gif HTTP/1.1". Once the server receives the HTTP request, the server processes the HTTP request to determine the requested resource at 310. The server then determines whether the requested resource is of a type that requires security at 315. This may be determined, for example, by analyzing a configuration file to see which types of resources are listed as requiring security. To indicate that a resource requires security in a configuration file, an administrator may include a command similar to the following in the configuration file:

```
<VirtualHost host:port>
    <Secure host:secure_port>
        Match "*.gif$"
    </Secure>
</VirtualHost>
```

In this example, any time the requested resource is a .gif file, the resource will require a secure connection. While a .gif file is used in this example, a person of ordinary skill in the art will readily appreciate that any web resource may be secured in this fashion.

In the case that the resource does not require a secure connection (NO branch of 315), the server retrieves the resource and sends it to the client computer at 320. If the server has not stopped listening on the current non-secure socket at 325 (for instance due to a configuration change, the web server application ending or the server being shut down), the server then awaits a next HTTP request at 305. If the server has stopped listening on the socket, the process ends at 330.

In the case that the requested resource is of a type requiring a secure connection (YES branch of 315), the server sends a redirect to the client computer with respect to the requested resource at 335. This may be performed using a Location directive, which may provide for access control by the URL. The secure socket may communicate via Secure Sockets Layer ("SSL"), Transport Layer Security ("TLS") or any other web security protocol. The server, which is configured to listen on the secure socket, then awaits a second request for the resource from the client computer to be sent to the secure host/port of the secure socket at 340. When the server receives the second request from the client computer on the secure socket at 345, the server retrieves the requested resource and provides the resource to the client at 350. Thereafter, if still listening on the non-secure socket (NO branch of 325), the server continues listening on the non-secure socket and awaits another HTTP request at 305.

As is commonly understood, HTTPS incorporates HTTP operating on the application layer of the TCP/IP model with SSL or TLS security operating on the transport layer. SSL or TLS encrypts the HTTP data before it is sent. As such, as noted above, implementations that provide an entire web page using a secure protocol, such as HTTPS, require more processing than non-secure protocols. However, not all resources need to be secure, such as image advertisements that a bank may wish to include with a secure page on the bank's website. Accordingly, some embodiments of the present invention enable the designation of certain resources on an otherwise secure page as non-secure.

FIG. 4 is a flow diagram illustrating a process flow for determining whether to not provide security for selected resources according to another embodiment of the present invention. In some embodiments, this process may be performed, for example, by server 200 of FIG. 2 via secure resource enforcer 245. In FIG. 4, the process flow begins with a server beginning to listen on a secure socket at 400. The server awaits an HTTPS request from a client at 405 over the secure socket, such as port 443, which is the known default port for HTTPS. While HTTPS is used in this example, one of ordinary skill in the art will readily appreciate that other secure client/server protocols may be used. Once the server receives the HTTPS request, the server processes the HTTPS request to determine the requested resource at 410. The server then determines whether the requested resource is of a type that does not require security at 415. This may be determined, for example, by analyzing a configuration file to see which types of resources are listed as not requiring security. To indicate that a resource does not require security in a configuration file, an administrator may include a command similar to the following in the configuration file:

```
<VirtualHost host:secure_port>
    <NonSecure host:port>
        Match "*.gif$"
    </NonSecure>
</VirtualHost>
```

In this example, any time the requested resource is a .gif file, the resource will not require a secure connection. While a .gif file is used in this example, a person of ordinary skill in the art will readily appreciate that any web resource may be exempted from security in this fashion.

In the case that the resource requires a secure connection (YES branch of 415), the server retrieves the resource and sends it to the client computer at 420, securely encrypting the data. If the server has not stopped listening on the current non-secure socket at 425 (for instance due to a configuration change, the web server application ending or the server being shut down), the server then awaits a next HTTPS request at 405. If the server has stopped listening on the socket, the process ends at 430.

In the case that the requested resource is of a type not requiring a secure connection (NO branch of 415), the server sends a redirect to the client computer with respect to the requested resource at 435. The server, which is configured to listen on the non-secure socket (such as port 80), then awaits a second request for the resource from the client computer to be sent to the non-secure host/port of the non-secure socket at 440. When the server receives the second request from the client computer on the non-secure socket at 445, the server retrieves the requested resource and provides the resource to the client at 450. Thereafter, if still listening on the secure socket (NO branch of 425), the server continues listening on the secure socket and awaits another HTTPS request at 405.

As disclosed, an embodiment is a secure resource enforcer configured to determine whether a resource listed in a web page requested by a client computer is of a type that requires a secure connection. Another embodiment is secure resource enforcer configured to determine whether a resource listed in a web page requested by a client computer over a secure connection is of a type that does not require a secure connection. This may be performed by a secure or non-secure directive added to a web server that responds to requests for resources of predetermined types with a redirect to a secure or non-secure host/port. Some embodiments of the present invention remove the burden of making a URL securely accessible from the developer of a web page, placing the power to secure selected resources in the hands of an administrator of a web server. The administrator does not need to worry about how the developer wrote the web page, even though the original document may not require secure access for certain resources.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer readable medium having instructions stored thereon that, when executed by a processor, cause the processor to perform a process that identifies and provides selected secure resources, the process comprising:
   receiving a first request over a non-secure socket from a client computer;
   determining whether a resource listed within a web page that is requested in the first request by the client computer requires a secure connection based on a type of the resource that is requested;
   when the resource requires the secure connection, sending a redirect to the client computer with respect to the resource, the redirect causing the client computer to send a second request over a secure socket using a HyperText Transfer Protocol Secure ("HTTPS") scheme and a Location directive;
   receiving a second request from the client computer for the resource over the secure socket; and
   providing the requested resource to the client over the secure socket.

2. The computer readable medium of claim 1, wherein there is no indication in the web page that the resource is to be obtained via a secure communication.

3. The computer readable medium of claim 1, wherein the web page comprises a HyperText Transfer Protocol ("HTML") file and the requested resource is designated in the HTML file.

4. The computer readable medium of claim 1, the process further comprising:
   controlling the processor to listen on the secure socket and to enable Secure sockets Layer ("SSL") on the secure socket.

5. The computer readable medium of claim 1, wherein resources that are to be provided via a secure connection are designated by a secure command of a virtual host configuration file of an application server.

6. The computer readable medium of claim 5, wherein the secure command of the virtual host configuration file of the application server is set by a web administrator.

7. An apparatus, comprising:
   a processor; and
   memory comprising a secure resource enforcer configured to identify and provide selected secure resources, the secure resource enforcer comprising
      a receiving module configured to receive a first request over a non-secure socket from a client computer;
      a determining module configured to determine whether a resource listed within a web page that is requested in the first request by the client computer requires a secure connection based on a type of the resource that is requested;
      a redirecting module configured, when the resource requires the secure connection, to send a redirect to the client computer with respect to the resource, the redirect causing the client computer to send a second request over a secure socket using a HyperText Transfer Protocol Secure ("HTTPS") scheme and a Location directive;
      a receiving module configured to receive a second request from the client computer for the resource over the secure socket; and
      a secure resource providing module configured to provide the requested resource to the client over the secure socket.

8. The apparatus of claim 7, wherein there is no indication in the web page that the resource is to be obtained via a secure communication.

9. The apparatus of claim 7, wherein resources that are to be provided via a secure connection are designated by a secure command of a virtual host configuration file of an application server.

10. The apparatus of claim 7, wherein the web page comprises a HyperText Transfer Protocol ("HTML") file and the requested resource is designated in the HTML file.

11. The apparatus of claim 7, wherein the processor is configured to listen on the secure socket and to enable Secure sockets Layer ("SSL") on the secure socket.

12. A computer-implemented method that identifies and provides selected secure resources, comprising:
   receiving a first request from a client computer for a resource listed within a single HTML web file over a non-secure socket;
   determining whether the resource listed within the web file requires a secure connection based on a type of the resource that the client computer requested;

when the resource requires the secure connection,
   sending a redirect to the client computer with respect to the resource, the redirect causing the client computer to send a second request over a secure socket using a HyperText Transfer Protocol Secure ("HTTPS") scheme and a Location directive,
   receiving a second request from the client computer for the resource over the secure socket, and
   providing the requested resource to the client computer over the secure socket; and when the resource does not require the secure connection, providing the resource to the client computer over the non-secure socket.

13. The computer-implemented method of claim 12, wherein there is no indication in the web page that the resource is to be obtained via a secure communication.

14. The computer-implemented method of claim 12, wherein resources that are to be provided via a secure connection are designated by a secure command of a virtual host configuration file of an application server.

* * * * *

UNITED STATES PATENT AND TRADEMARK OFFICE
CERTIFICATE OF CORRECTION

PATENT NO. : 8,195,818 B2  Page 1 of 1
APPLICATION NO. : 12/489007
DATED : June 5, 2012
INVENTOR(S) : Srinivasan et al.

It is certified that error appears in the above-identified patent and that said Letters Patent is hereby corrected as shown below:

In column 8, line 8, in Claim 3, delete "("HTML")" and insert -- ("HTTP") --, therefor.

In column 8, line 55, in Claim 10, delete "("HTML")" and insert -- ("HTTP") --, therefor.

Signed and Sealed this
Eleventh Day of September, 2012

David J. Kappos
*Director of the United States Patent and Trademark Office*